(12) United States Patent
Van De Sluis et al.

(10) Patent No.: US 10,715,253 B2
(45) Date of Patent: Jul. 14, 2020

(54) ASSOCIATING CONTENT WITH ONE OR MORE LIGHT BEACONS BASED ON GEOGRAPHICAL INDICATOR

(71) Applicant: SIGNIFY HOLDING B.V., Eindhoven (NL)

(72) Inventors: Bartel Marinus Van De Sluis, Eindhoven (NL); Dzmitry Viktorovich Aliakseyeu, Eindhoven (NL); Dirk Valentinus René Engelen, Heusden-Zolder (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/490,629

(22) PCT Filed: Feb. 20, 2018

(86) PCT No.: PCT/EP2018/054085
§ 371 (c)(1),
(2) Date: Sep. 3, 2019

(87) PCT Pub. No.: WO2018/158105
PCT Pub. Date: Sep. 7, 2018

(65) Prior Publication Data
US 2020/0007231 A1 Jan. 2, 2020

(30) Foreign Application Priority Data

Mar. 2, 2017 (EP) .................................... 17158895

(51) Int. Cl.
*H04B 10/116* (2013.01)

(52) U.S. Cl.
CPC ................................ *H04B 10/116* (2013.01)

(58) Field of Classification Search
CPC ..................................................... H04B 10/116
See application file for complete search history.

(56) References Cited

U.S. PATENT DOCUMENTS

| | | | |
|---|---|---|---|
| 9,654,222 B1* | 5/2017 | Shatz | H04B 10/66 |
| 10,395,453 B1* | 8/2019 | Koo | G06F 21/31 |
| 2008/0310850 A1* | 12/2008 | Pederson | H04B 3/54 |
| | | | 398/135 |
| 2011/0069962 A1* | 3/2011 | Castor | H04W 48/16 |
| | | | 398/115 |
| 2013/0336660 A1* | 12/2013 | Chin | G01S 1/70 |
| | | | 398/118 |

(Continued)

FOREIGN PATENT DOCUMENTS

WO 2016026979 A1 2/2016

*Primary Examiner* — Mina M Shalaby
(74) *Attorney, Agent, or Firm* — Meenakshy Chakravorty (57) ABSTRACT

A system is configured to receive a geographical indicator, to determine at least one light beacon (61-69) based on the geographical indicator, to output information (82) identifying the at least one light beacon, to receive a selection of one or more (61-68) of the at least one light beacon, to receive a content item or a reference to a content item in relation to the one or more light beacons, and to associate the content item with the one or more light beacons. The association causes the one or more light beacons to transmit data via visible light which enables reproduction of the content item.

15 Claims, 7 Drawing Sheets

(56) References Cited

U.S. PATENT DOCUMENTS

| | | | | |
|---|---|---|---|---|
| 2014/0143034 A1* | 5/2014 | Pi | ................... | H04B 10/116 |
| | | | | 705/14.4 |
| 2014/0280316 A1* | 9/2014 | Ganick | .............. | H04B 10/1149 |
| | | | | 707/769 |
| 2015/0358079 A1* | 12/2015 | Cronin | ................. | H04B 10/116 |
| | | | | 398/118 |
| 2015/0373503 A1* | 12/2015 | Jovicic | .................. | G01S 5/0252 |
| | | | | 455/456.1 |
| 2016/0047890 A1* | 2/2016 | Ryan | ................... | G01C 21/206 |
| | | | | 398/118 |
| 2016/0227634 A1* | 8/2016 | Engelen | ................ | G05D 1/0022 |
| 2016/0277999 A1 | 9/2016 | Graves et al. | | |
| 2016/0299214 A1 | 10/2016 | Engelen et al. | | |
| 2017/0141848 A1* | 5/2017 | Daoud | ................. | H04W 4/029 |
| 2017/0206644 A1* | 7/2017 | Megginson | ........... | H04B 10/116 |
| 2017/0206721 A1* | 7/2017 | Koo | ......................... | G07C 9/21 |
| 2017/0351946 A1* | 12/2017 | Jayawardena | ....... | G06Q 10/087 |
| 2020/0007231 A1* | 1/2020 | Van De Sluis | ...... | H04B 10/116 |

\* cited by examiner

ASSOCIATING CONTENT WITH ONE OR MORE LIGHT BEACONS BASED ON GEOGRAPHICAL INDICATOR

CROSS-REFERENCE TO PRIOR APPLICATIONS

This application is the U.S. National Phase application under 35 U.S.C. § 371 of International Application No. PCT/EP2018/054085, filed on Feb. 20, 2018, which claims the benefit of European Patent Application No. 17158895.7, filed on Mar. 2, 2017. These applications are hereby incorporated by reference herein.

FIELD OF THE INVENTION

The invention relates to a system for associating content with one or more light beacons.

The invention further relates to a method of associating content with one or more light beacons.

The invention also relates to a computer program product enabling a computer system to perform such a method.

BACKGROUND OF THE INVENTION

The provision of location-dependent content inside buildings is becoming increasingly popular and is used in museums and shops, for example. As GPS location determination does not work properly inside buildings, beacons are often used inside buildings instead of GPS to provide location-dependent content. Beacons can also be used outdoors.

US 2016/0277999 A1 discloses a mobile content management system which includes a plurality of distributed beacon transmitters, each configured to continuously broadcast messages including a host URL. Client devices proximate to one or more of the beacons are able to receive the broadcast message and subsequently transmit content requests to the host server located at the host URL. The host server returns an appropriate destination URL whose content may be obtained by the client device and reproduced on the client device. Administrators can use a web portal to associate beacon IDs with destination URLs. This may be done for multiple beacons in one action using a bulk edit feature.

A drawback of the web portal disclosed in US2016/0277999 A1 is that it has not been designed for users who are not administrators, e.g. social media users who want to share content with people who are present at the same event. The web portal requires the administrator to know and enter beacon IDs and is therefore not suitable for users who are not administrators, i.e. users that do not know the relevant beacon IDs and/or do not only want to associate content with the same set of beacons again and again.

SUMMARY OF THE INVENTION

It is a first object of the invention to provide a system for associating content with one or more light beacons, which is suitable for users who are not administrators.

It is a second object of the invention to provide a method of associating content with one or more light beacons, which is suitable for users who are not administrators.

In a first aspect of the invention, the system for associating content with one or more light beacons comprises a server, the server comprising at least one input interface for receiving input, an output interface for providing output, and at least one processor configured to receive a geographical indicator, to determine a set of at least one light beacon based on said geographical indicator, each of said at least one light beacon being configured to transmit data via visible light, to use said output interface to output information identifying said set of at least one light beacon, to use said at least one input interface to receive a selection of one or more light beacons of said set of at least one light beacon (61-69), to use said at least one input interface to receive a content item or a reference to a content item to be associated with said one or more light beacons, and to associate said content item with said one or more light beacons, said association causing said one or more light beacons to transmit data via visible light which enables reproduction of said content item. The content may be reproduced (e.g. displayed) on the screen of a mobile device or on augmented reality glasses, for example. Transmitting data via visible light is commonly referred to as Visible Light Communication (VLC). The content item may be associated with the one or more light beacons by associating the reference to the content item with the one or more light beacons, for example.

The inventors have recognized that by identifying light beacons based on a received geographical indicator, e.g. a geographical area or a geographical location, and receiving a selection of the identified light beacons, it becomes much easier to associate content with one or more beacons, especially for users who are not administrators. The received geographical indicator may be a location or area selected on a map by a user or a GPS location of a device, for example. If the received geographical indication is a location, all light beacons within a certain range of the location may be identified or all light beacons at the same place (the place associated with the location, e.g. a building, stadium, square or park) may be identified, for example. A received area may comprise an identification of a place (e.g. "Philips Stadium"), multiple locations (e.g. defining opposing corners of a rectangle, e.g. defining a path or trajectory) or a location and a radius, for example.

Associating the content item with the one or more light beacons may comprise configuring the one or more light beacons to transmit a different or additional identifier or to transmit the content item itself, for example. The different or additional identifier may comprise an URL leading to the content item directly or may be used to obtain such an URL or the content item itself from a connected system. Alternatively, the one or more light beacons may continue to transmit the same identifier (e.g. an identifier assigned when the beacon was installed). In this case, associating the content item with the one or more light beacons may comprise associating this identifier with a different or additional URL or a different or additional content item in the connected system (from which the URL or the content item may be obtained), for example.

Said at least one processor may be configured to use said at least one input interface to receive an indication of one or more time windows to be associated with said one or more light beacons and to associate said content item with said one or more light beacons during said one or more time windows. Although it may be possible let the association take effect immediately when the selection of light beacons and the content item (or reference thereto) has been received or when a payment has been received (if applicable), making the association for one or more future time windows gives a better chance that desired light beacons are still available.

Said at least one processor may be configured to use said at least one input interface to receive a reproduction condition to be associated with said one or more light beacons, said content item only being allowed to be reproduced on a device when said reproduction condition is met, and to associate said content item with said one or more light beacons and said reproduction condition. Said reproduction condition may comprise a group identifier identifying a group to which a user of said device should belong, a required weather condition and/or a maximum distance between a light beacon transmitting data and said device. This allows the content to be targeted to specific groups of persons and/or to be shown in specific situations, e.g. advertisements for umbrellas when it is raining and advertisements for sunscreen when it is hot and sunny. By targeting the content on the reproduction device or on a connected system (that provides URLs or content items associated with identifiers transmitted by light beacons) instead of at the light beacons themselves, a better targeting may be achieved.

Said at least one processor may be configured to use said at least one input interface to receive a transmission condition to be associated with said one or more light beacons and to configure said one or more light beacons such that said one or more light beacons transmit first data if said transmission condition is met and second data if said transmission condition is not met, said first data enabling reproduction of said content item and said second data not enabling reproduction of said content item. Said transmission condition may comprise a required weather condition. This prevents that a reproduction device needs to be relied on to check a reproduction condition, e.g. when light beacons transmit content items or URLs to contents and no connected system is used.

Said system may comprise a memory and said at least one processor may be configured to store an association between said content item or said reference to said content item and said one or more selected light beacons in said memory. In this way, a light beacon can continue to transmit the same identifier and does not have to be connected to the Internet or another network. Only the association on the system needs to be changed.

Said one or more light beacons may comprise a plurality of light beacons and said at least one processor may be configured to use said at least one input interface to further receive an indication of a path from a first set of said plurality of light beacons to a last set of said plurality of light beacons and to associate said content item with said first set of light beacons during a first time window and with said last set of light beacons during a last time window, said last time window starting later than said first time window. This allows content to follow a route.

Said one or more light beacons may comprise a plurality of light beacons and said at least one processor is configured to use said at least one input interface to further receive an indication of a content speed parameter and to associate said content item with a first set of light beacons during a first time window and with a last set of light beacons during a last time window, a difference between the beginning of said first time window and the beginning of said last time window depending on said content speed parameter. This allows content to follow a route using an estimated speed of a target group, which may be athletes participating in a running or cycling event or tourists walking from a train station to the entrance of an amusement park, for example. Said content speed may be a parameter setting a value, such as e.g. a speed, e.g. 14 km/h.

In aspects: The system according to the first aspect of the invention may further comprise at least one lighting device; such as for example a luminaire, a light beacon, a flood light, or a pixillated LED spot, etc. Furthermore, the system according to the first aspect of the invention may further comprise at least one device according to the invention; such as for example a user device, a smartphone, a tablet, a smart-glass, a VR-goggle, etc. Such aspects may be advantagous as all components of the system may be inter-compatible.

In a second aspect of the invention, the method of associating content with one or more light beacons comprises receiving a geographical indicator, determining at least one light beacon based on said geographical indicator, each of said at least one light beacon being configured to transmit data via visible light, outputting information identifying said at least one light beacon, receiving a selection of one or more of said at least one light beacon, receiving a content item or a reference to a content item to be associated with said one or more light beacons, and associating said content item with said one or more light beacons, said association causing said one or more light beacons to transmit data via visible light which enables reproduction of said content item. The method may be implemented in hardware and/or software.

The method may further comprise receiving an indication of one or more time windows to be associated with said one or more light beacons, wherein associating said content item with said one or more light beacons comprises associating said content item with said one or more light beacons during said one or more time windows.

The method may further comprise receiving a reproduction condition to be associated with said one or more light beacons, said content item only being allowed to be reproduced on a device when said reproduction condition is met, wherein associating said content item with said one or more light beacons comprises associating said content item with said one or more light beacons and said reproduction condition.

The method may further comprise receiving a transmission condition to be associated with said one or more light beacons and configuring said one or more light beacons such that said one or more light beacons transmit first data if said transmission condition is met and second data if said transmission condition is not met, said first data enabling reproduction of said content item and said second data not enabling reproduction of said content item.

The method may further comprise receiving a confirmation that a payment has been received, said content item only being associated with said one or more light beacons if said confirmation is received.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: receiving a geographical indicator, determining at least one light beacon based on said geographical indicator, each of said at least one light beacon being configured to transmit data via visible light, outputting information identifying said at least one light beacon, receiving a selection of one or more of said at least one light beacon, receiving a content item or a reference to a content item in relation to said one or more light beacons, and associating said content item with said one or more light beacons, said association causing said one or more light beacons to transmit data via visible light which enables reproduction of said content item.

In a further aspect of the invention, the at least one processor may be configured to autonomously select a content item to be associated with one or more light beacons. The at least one processor may use said at least one input interface to receive this autonomously selected content item or a reference to this autonomously selected content item to be associated with said one or more light beacons. A content item may e.g. be autonomously selected by using the input/output interface to recognize a plurality of devices providing a plurality of content items, and configuring the processor to select a content item from the plurality of content items. Hence, the server according to the invention may be arranged for scanning an environment for a plurality of content items in order to select a content item therefrom. The output interface may for example send a request to one of the plurality of devices providing the plurality of content items to send a content item being the autonomously selected content item. Said autonomous selection may be based on a criterion, such as for example a type of the content item, a tag characterizing the content item, a length of the content item, a rating of the content item, an amount of views of the content item, a location identified within the content item, a geographical location, the identity of the creator of the content item, etc. Moreover, in such examples of autonomous selection of a content item, the selection of one or more light beacons may for example be received by information contained in the content item itself. Hence, the content item may for example already be indicating which one or more light beacons to select for reprodicing the content item. The advantage of such an autonomous selection of a content item is that the system according to the invention may provide an improved functionality of providing content items to beacons.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java(™), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

FIGS. 1 to 6 show embodiments of the system 1000, 2000, 3000, 4000, 5000, 6000 of the invention, a first server 21, and a computer 33, a light beacon 11, a mobile device 1 and a second server 35. The first server 21 comprises a processor 25, a transceiver 29, 29', a power supply 27 and possibly a memory 31. The light beacon 11 comprises a lamp 13, a processor 15, a power supply 17 and possibly a transceiver 19 and a memory 31. The mobile device 1 comprises a processor 5, a sensor 3, a battery 7 and a transceiver 9. In FIGS. 1 to 6, the system of the invention comprises a single server 21. In an alternative embodiment, the system comprises multiple devices. In the embodiments shown in FIGS. 1 to 6, the light beacon 11 is the only light beacon from which the mobile device 1 receives data via visible light.

Figure 1:
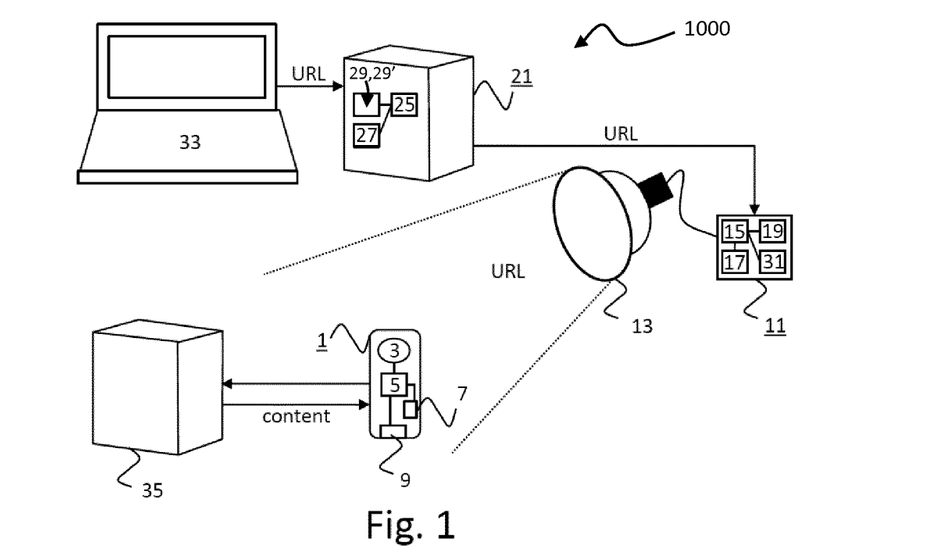
FIG. 1 is a block diagram of a first embodiment of the system of the invention.

In FIG. 1, the computer 33 is configured to provide an URL pointing to a content item on the second server 35 to the first server 21, the first server 21 is configured to provide the URL to the light beacon 11 and the light beacon 11 is configured to transmit the URL via visible light. The mobile device 1 is configured to receive the URL from the light beacon 11 and to obtain the content item from the second server 35.

In particular, the processor 25 of the first server 21 is configured to use the transceiver 29,29' receive the URL from the computer 33 and transmit the URL to the light beacon 11. The processor 25 is further configured to receive or determine information which allows it to identify the light beacon 11.

The processor 15 of the light beacon 11 is configured to receive the URL from the first server 21 using the transceiver 19, to store the received URL in memory 31 and to use the lamp 13 to transmit the stored URL via visible light. The processor 5 of the mobile device 1 is configured to use the sensor 3 to receive the URL transmitted by light beacon 11 via visible light and to use the transceiver 9 to transmit a request (e.g. an HTTP request) to the second server 35 identified in the URL and receive the content item from the second server 35 in response to the request. The processor 5 of the mobile device is configured to reproduce the content item, e.g. using a display or an audio output.

Figure 2:
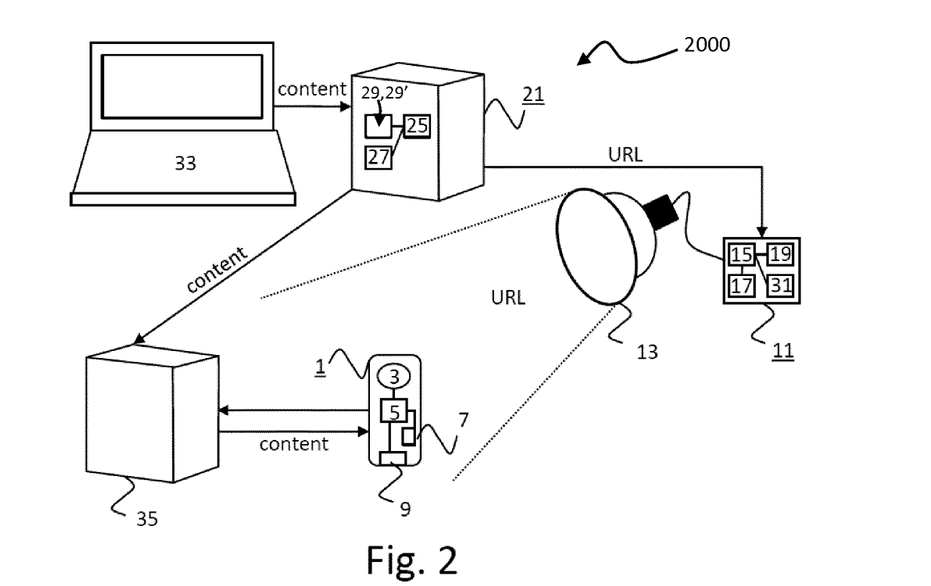
FIG. 2 is a block diagram of a second embodiment of the system of the invention.

In FIG. 2, the computer 33 is configured to provide a content item to the first server 21, the first server 21 is configured to store the content item on the second server 35 and provide the URL pointing to the content item stored on the second server 35 to the light beacon 11 and the light beacon 11 is configured to transmit the URL via visible light. The mobile device 1 is configured to receive the URL from the light beacon 11 and to obtain the content item from the second server 35.

In particular, the processor 25 of the first server 21 is configured to use transceiver 29,29' to receive the content item from the computer 33, to instruct the second server 35 to publish the content item and provide the URL of the published content item, to receive the URL to the published content item from the second server 35 and to transmit this URL to the light beacon 11. The processor 25 is further configured to receive or determine information which allows it to identify the light beacon 11. The processor 15 of the light beacon 11 and the processor 5 of the mobile device 1 are configured as described in relation to FIG. 1.

The URL transmitted by the light beacon 13 might point to a content stream, e.g. a stream of live content, made available at the second server 35. This URL might be temporal in nature, i.e. the URL that leads to the content stream on the second server 35 may be changed to a new URL after a certain period of time, e.g. every 15 minutes, and the processor 25 of the first server 21 may be configured to use the transceiver 29' to transmit each new URL to the light beacon 11. As a result, the mobile device 1 will only be able to continue reproducing the content stream if it receives each new URL from the light beacon 11. This ensures that the user of mobile device 1 can only view the content stream while being nearby the light beacon 11. The processor 25 may be configured to use transceiver 29' to send a request for this change in URL to the second server 35 every certain period of time or the second server 35 may change the URL and provide the new URL to the first server 25 automatically every certain period of time.

Figure 3:
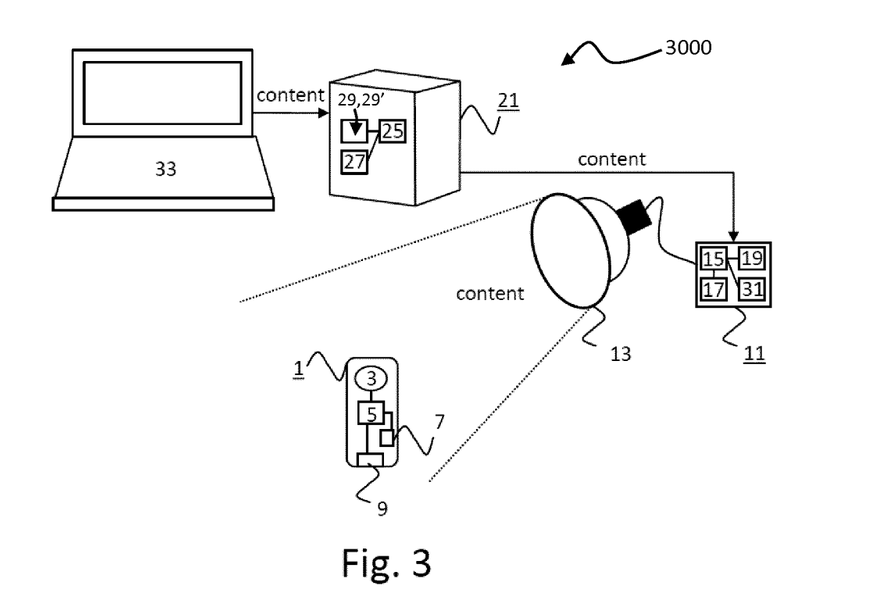
FIG. 3 is a block diagram of a third embodiment of the system of the invention.

In FIG. 3, the computer 33 is configured to provide a content item to the first server 21, the first server 21 is configured to provide the content item to the light beacon 11 and the light beacon 11 is configured to transmit the content item via visible light. The mobile device 1 is configured to receive the content item from the light beacon 11.

In particular, the processor 25 of the first server 21 is configured to use the transceiver 29,29' to receive content item from the computer 33 and transmit the content item to the light beacon 11. The processor 25 is further configured to receive or determine information which allows it to identify the light beacon 11. The processor 15 of the light beacon 11 is configured to receive the content item from the first server 21 using the transceiver 19, to store the received content item in memory 31 and to use the lamp 13 to transmit the stored content item via visible light. The processor 5 of the mobile device 1 is configured to use the sensor 3 to receive the content item transmitted by light beacon 11 via visible light and to reproduce the content item, e.g. using a display or an audio output.

Figure 4:
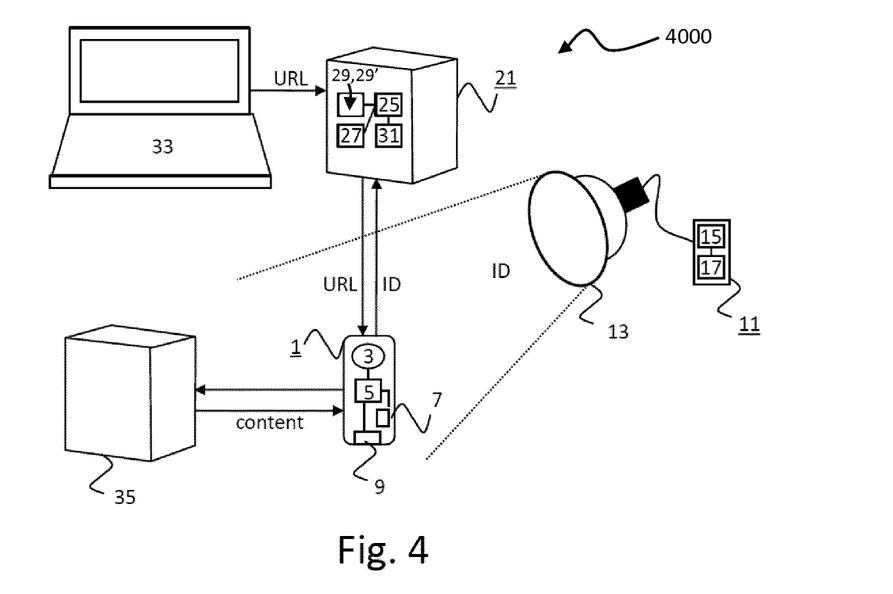
FIG. 4 is a block diagram of a fourth embodiment of the system of the invention.

In FIG. 4, the light beacon 11 is configured to transmit an identifier via visible light and is not connected to the first server 21, the computer 33 is configured to provide an URL pointing to a content item on the second server 35 to the first server 21, the first server 21 is configured to associate the URL with the identifier and to provide the URL to the mobile device 1 when the mobile device 1 requests the URL associated with the identifier. The mobile device 1 is configured to receive the identifier from the light beacon 11 via visible light, to obtain the URL associated with the identifier from the first server 21 and to obtain the content item to which the URL points from the second server 35.

In particular, the processor 15 of the light beacon 11 is configured to use the lamp 13 to transmit the identifier. The identifier may be configured when the light beacon 11 is installed, for example. The processor 25 of the first server 21 is configured to use the transceiver 29 to receive the URL from the computer 33 and to receive the identifier of the light beacon 11 from the computer or to receive or determine information which allows it to identify the light beacon 11 and/or the identifier transmitted by the light beacon 11. The processor 25 of the first server 21 is further configured to associate the identifier transmitted by the light beacon 11 with the received URL in the memory 31 of the first server 21. The processor 25 of the first server 21 is also configured to use the transceiver 29,29' to receive a request to provide an URL associated with an identifier, to lookup the URL associated with identifier in the memory 31 and to provide the URL in response to the request.

The processor 5 of the mobile device 1 is configured to use the sensor 3 to receive the identifier transmitted by the light beacon 11 via visible light and to use the transceiver 9 to transmit a request to the first server 21 to provide the URL associated with this identifier and receive a response comprising the requested URL from the first server 21. The processor 5 is further configured to use the transceiver 9 to transmit a request (e.g. an HTTP request) to the second server 35 identified in the received URL and receive the content item from the second server 35 in response to the request. The processor 5 is also configured to reproduce the content item, e.g. using a display or an audio output.

Figure 5:
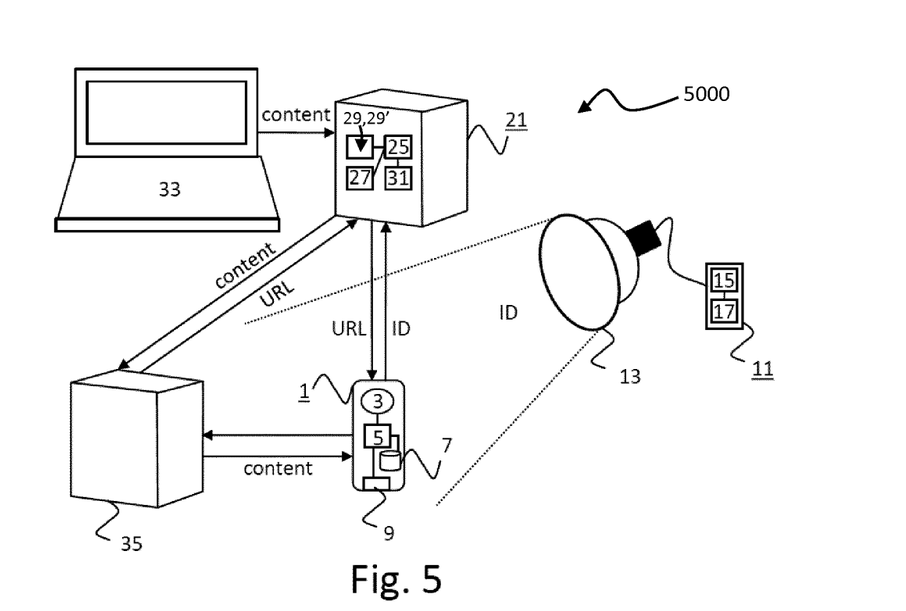
FIG. 5 is a block diagram of a fifth embodiment of the system of the invention.

In FIG. 5, the light beacon 11 is configured to transmit an identifier via visible light and is not connected to the first server 21, the computer 33 is configured to provide a content item to the first server 21, and the first server 21 is configured to store the content item on the second server 35, associate the URL pointing to the content item with the identifier and to provide this URL to the mobile device 1 when the mobile device 1 requests the URL associated with the identifier. The mobile device 1 is configured to receive the identifier from the light beacon 11 via visible light, to obtain the URL associated with the identifier from the first server 21 and to obtain the content item to which the URL points from the second server 35.

In particular, the processor 15 of the light beacon 11 is configured to use the lamp 13 to transmit the identifier. The identifier may be configured when the light beacon 11 is installed, for example. The processor 25 of the first server 21 is configured to use the transceiver 29 to receive the content item from the computer 33 and receive the identifier of the light beacon 11 from the computer or to receive or determine information which allows it to identify the light beacon 11 and/or the identifier transmitted by the light beacon 11.

The processor 25 is further configured to use the transceiver 29' to instruct the second server 35 to publish the content item and provide the URL of the published content item, to use the transceiver 29 to receive the URL to the published content from the second server 35, and to associate this URL with the identifier transmitted by the light beacon 11 in the memory 31 of the first server 21. The processor 25 is also configured to use the transceiver 29,29' to receive a request to provide an URL associated with an identifier, to lookup the URL associated with identifier in the memory 31 and to provide the URL in response to the request. The processor 15 of the light beacon 11 and the processor 5 of the mobile device 1 are configured as described in relation to FIG. 4.

Figure 6:
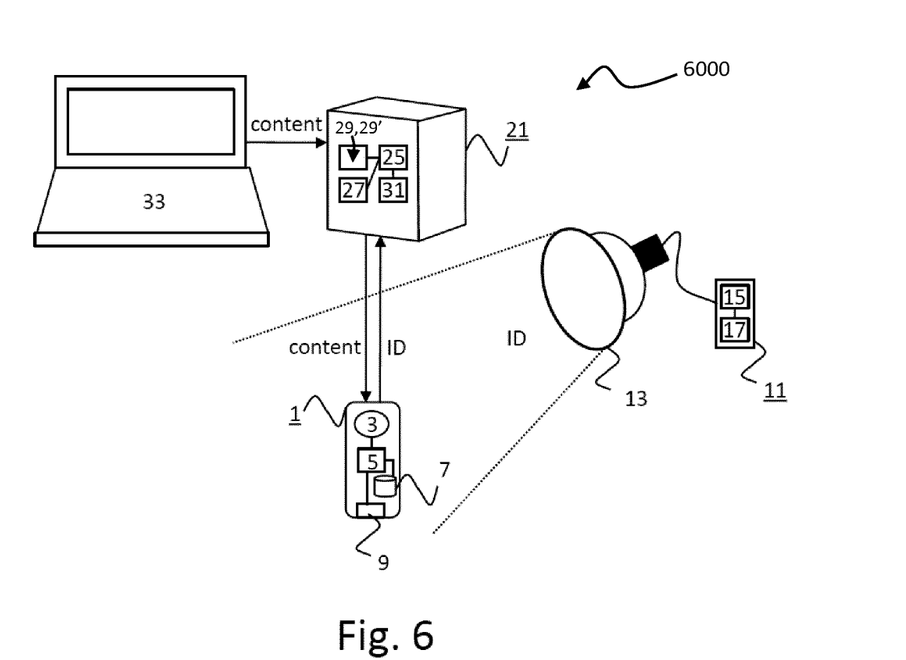
FIG. 6 is a block diagram of a sixth embodiment of the system of the invention.

In FIG. 6, the light beacon 11 is configured to transmit an identifier via visible light and is not connected to the first server 21, the computer 33 is configured to provide a content item to the first server 21, and the first server 21 is configured to associate the content item with the identifier and to provide this content item to the mobile device 1 when the mobile device 1 requests the content item associated with the identifier. The mobile device 1 is configured to receive the identifier from the light beacon 11 via visible light and to obtain the content item associated with the identifier from the first server 21.

In particular, the processor 15 of the light beacon 11 is configured to use the lamp 13 to transmit the identifier. The identifier may be configured when the light beacon 11 is installed, for example. The processor 25 of the first server 21 is configured to use the transceiver 29 to receive the content item from the computer 33 and receive the identifier of the light beacon 11 from the computer 33 or to receive or determine information which allows it to identify the light beacon 11 and/or the identifier transmitted by the light beacon 11.

The processor 25 is further configured to associate this content item with the identifier transmitted by the light beacon 11 in the memory 31 of the first server 21. The processor 25 of the first server 21 is also configured to use the transceiver 29 to receive a request to provide a content item associated with an identifier, to lookup the content item associated with identifier in the memory 31 and to provide the content item in response to the request.

The processor 5 of the mobile device 1 is configured to use the sensor 3 to receive the identifier transmitted by the light beacon 11 via visible light and to use the transceiver 9 to transmit a request to provide the content item associated with this identifier to the first server 21 and receive a response comprising the requested content item from the first server 21. The processor 5 is also configured to reproduce the content item, e.g. using a display or an audio output.

The computer 33 may comprise a laptop, personal computer, mobile phone, tablet, video camera device or photo camera device, for example. The computer 33 may comprise an input device, e.g. a keyboard or touch screen, for entering an URL or for selecting a content item and a display for verifying the entered URL or selected content item, for example. The content item may comprise video, one or more still images, audio and/or text, for example. In an embodiment, the entered URL points to a content item stored on the computer 33 or to a live content item being captured by the computer 33.

The processor 25 of the first server 21 may be a general-purpose processor, e.g. from Intel or AMD, or an application-specific processor. The processor 25 of the first server 21 may run a Windows-based or Unix-based operating system, for example. In the embodiment shown in FIGS. 1 to 6, the first server 21 comprises one processor 25. In an alternative embodiment, the first server 21 comprises multiple processors. The first server 21 may comprise other components typical for a server. The second server 35 may comprise similar hardware as the first server 21. The first server 21 and/or the second server 35 may run a web server.

The memory 31 may comprise solid state memory, a hard disk and/or an optical disc, for example. The lamp 13 of the light beacon 11 comprises one or more light sources, e.g. LEDs. The processor 15 of the mobile device 1 may be a general-purpose processor, e.g. from ARM, or an application-specific processor. The lamp 13 and the processor 15 may be incorporated in a single device or may be incorporated into multiple devices connected by a wire or connected wirelessly. In the embodiment shown in FIGS. 1 to 6, the light beacon comprises one processor 15. In an alternative embodiment, the light beacon 11 comprises multiple processors. The light beacon 11 may comprise other components typical for a beacon.

The mobile device 1 may comprise a laptop, mobile phone, tablet, video camera device, photo camera device or pair of augmented reality glasses, for example. The sensor 3 may comprise a camera and/or a light sensor, for example. The paper "Luxapose: Indoor Positioning with Mobile Phones and Visible Light" by Kuo et al., published on pages 447-458 of the MobiCom '14 Proceedings of the 20th annual international conference on Mobile computing and networking in September 2014, discloses the use of conventional smartphone hardware for receiving data from light beacons via visible light. The method involves determining the location of a camera-equipped smartphone with the help of LED luminaires that transmit identifiers and/or locations encoded in human-imperceptible optical pulses. The camera-equipped smartphone is an unmodified smartphone whose exposure and ISO settings are changed in order to detect and decode the transmitted visible light data. The processor 5 of the mobile device 1 may be a general-purpose processor, e.g. from ARM or Qualcomm, or an application-specific processor. The processor 5 of the mobile device 1 may run an iOS, Windows or Android operating system for example. In the embodiment shown in FIGS. 1 to 6, the mobile device 1 comprises one processor 5. In an alternative embodiment, the mobile device 1 comprises multiple processors. The mobile device 1 may comprise other components typical for a mobile device.

In the embodiment shown in FIGS. 1 to 6, receiver and transmitter are combined in a single transceiver (transceivers 9, 19 and 29,29'). In an alternative embodiment, the receiver and transmitter may be separate components. Instead of a single transceiver, multiple transceivers may be used. In an alternative embodiment, the light beacon 11 comprises only a receiver instead of a transceiver 19. One or more of the following communication technologies may be supported, for example, by the transceivers: Ethernet (IEEE 802.3) Wi-Fi (IEEE 802.11), Bluetooth, ZigBee, GPRS, EDGE, UMTS, LTE, 5G. The invention may be implemented using a computer program running on one or more processors.

The processor 25 of the first server 21 is configured to use the transceiver 29 to receive a geographical indicator from the computer 33 and to determine at least one light beacon based on the geographical indicator. The processor 25 is further configured to use transceiver 29' to output information identifying the at least one light beacon and to receive a selection of one or more of the at least one light beacon. The processor 25 is further configured to associate the content item with the one or more light beacons. The geographical indicator may comprise a geographical location, e.g. a GPS location of the computer 33, or a geographical area, e.g. a place or a plurality of locations. For example, a user of the computer may 33 be able to select a rectangle or circle comprising a plurality of locations on a geographical map In a simple embodiment, there is a pre-determined period of time for the association, but alternatively, the time period can also be made dependent on the advertising user's subscription, the type of selected content, a next request for association with the same light beacon(s) or the beacon popularity (or number of views), or the default association duration may depend on the overall demand for other content-beacon associations in the area.

Figure 7:
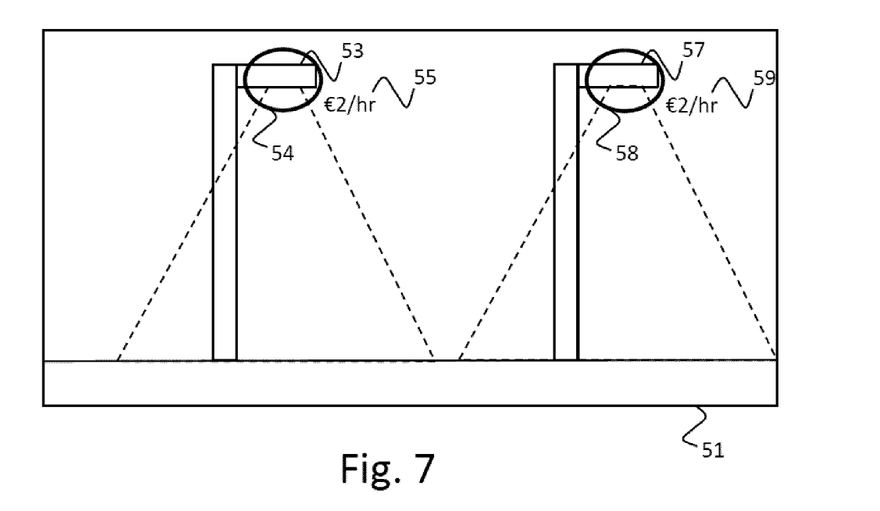
FIG. 7 is a first example of a user interface for selecting identified light beacons.

The information identifying the at least one light beacon may comprise a set of GPS locations of the at least one light beacon. The identified light beacons that are in the view of the camera may be highlighted on the display of the computer 33 using augmented reality, as shown in FIG. 7, for example. Two street lamps 53 and 57 are shown in the image 51 captured by the camera. Street lamp 53 is highlighted with a circle 54. Next to circle 54, the price 55 of associating content with the lamp 53 is shown. Street lamp 57 is highlighted with a circle 58. Next to circle 58, the price 59 of associating content with the lamp 57 is shown. In this example, the price is 2 Euro per hour per street lamp. In this embodiment, the computer 33 is preferably a mobile device, e.g. a pair of augmented reality glasses.

The same principle may be used by visitors of an event like a sports match or concert to rent a light beacon at the event and associate personal content or an advertisement with the light beacon. For instance, instead of having to make a recording first, people can directly share their experience in real-time. Next to captured audio or video streams, it may also be possible to link a Twitter or News feed to a light beacon. Possibly the light beacon identifier may even be added as a tag a Twitter feed (e.g. # beacon 123). The first server 21 may thus make use of or may be coupled to social media networks.

The light beacon may also be provided as part of a directable spotlight. For instance, at a theatre or in a stadium a spotlight may be moved over an audience using either a motorized moving head or by controlling a pixelated spotlight array. Once that someone in the audience catches an identifier transmitted by the light beacon via visible light with his smart device, this can be communicated back to the lighting system (e.g. the first server 21) such that the spotlight beam is adjusted. For instance, the spotlight may show a color or dynamic light effect indicating the successful catch(es) of the identifier. It is also possible that the spotlight instantly stops moving upon a catch, thereby putting the catching user in the spotlight.

As an additional feature, the (app on the) smart device that has successfully caught the identifier and stopped the light beam can facilitate an A/V link to the stadium infrastructure thereby providing some "airtime" for the winning user which he can use to make a performance or announcement. So in this case, the received "treasure code" is used by the app on the smart device to establish the connection and the user can use the camera and/or microphone of his smart device to sing a song or make an announcement, which possibly requires a payment of the user. In the meantime, an additional moving spotlight may enable someone else to catch the (subsequent) "treasure code" which once it is caught by a second user switches off the first spotlight and/or breaks the corresponding connection to the first user's smart device.

Figure 8:
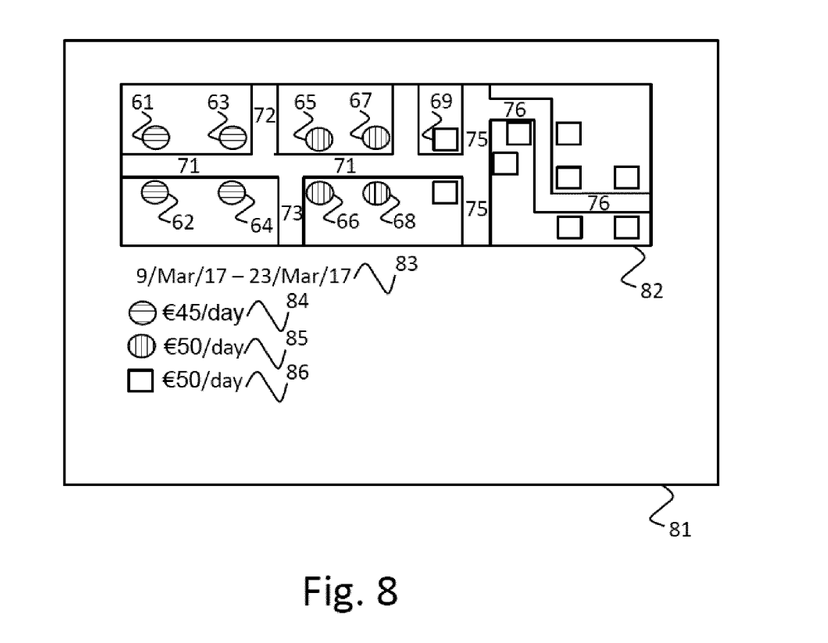
FIG. 8 is a second example of a user interface for selecting identified light beacons.

Alternatively, the identified light beacons may be represented on a geographical map, as shown in FIG. 8, for example. Light beacons, e.g. street lamps, 61 to 69 are identified, amongst others, in the map portion 82 of image 81 along with street names 71 to 76. The user of the computer 33 has selected light beacons 61 to 68 from the identified light beacons. The price of associating content with the light beacons is displayed as descriptions 84 to 86. Description 84 indicates that the price of "renting" light beacons 61 to 64 is 45 Euro per day per light beacon. Description 85 indicates that the price of "renting" light beacons 65 to 68 is 50 Euro per day per light beacon. Description 86 indicates that the price of "renting" the non-selected light beacons, including non-selected light beacon 69, is also 50 Euro per day per light beacon.

In this way, light beacons across the city may be rented out to link (promotion) content to them. For instance, this enables augmented reality users or future self-driving cars to experience promotional content related to their current location in the city. The content could be highly personalized in such a way that people will appreciate the content because it is based on a very good match with their interests or intentions. For instance, tourists may be informed about tourist attractions, while business travelers will be informed about locations relevant to their profile and business interests.

In this embodiment, the processor 25 of the first server 21 is configured to use the transceiver 29 to receive an indication of one or more time windows to be associated with the one or more light beacons from the computer 33 and to associate the content item with the one or more light beacons during the one or more time windows. In the example shown in FIG. 8, a time window 83 of 9 Mar. 2017 to 23 Mar. 2017 is indicated. It may also be possible to indicate a start time on the start date and/or to indicate an end time on the end date (not shown).

In the same embodiment or in another embodiment, the processor 25 of the first server 21 is configured to use the transceiver 29 to further receive an indication of a path from a first set of the light beacons to a last set of the light beacons from the computer 33. The processor 25 is further configured to associate the content item with the first set of light beacons during a first time window and with the last set of light beacons during a last time window. The last time window starts later than the first time window. This makes the display of content follow a route. In the example shown in FIG. 9, a path is indicated by the user of computer 33 by assigning letters to the light beacons. The letter A has been assigned to the first set of light beacons 97 and 98. The letter D has been assigned to the last set of light beacons 91 and 92. The letters C and D have been assigned to intermediate sets of light beacons 93 to 96. Instead of assigning letters to light beacons, the user of computer 33 may be able to indicate the path by indicating a starting point and a trajectory.

Figure 9:
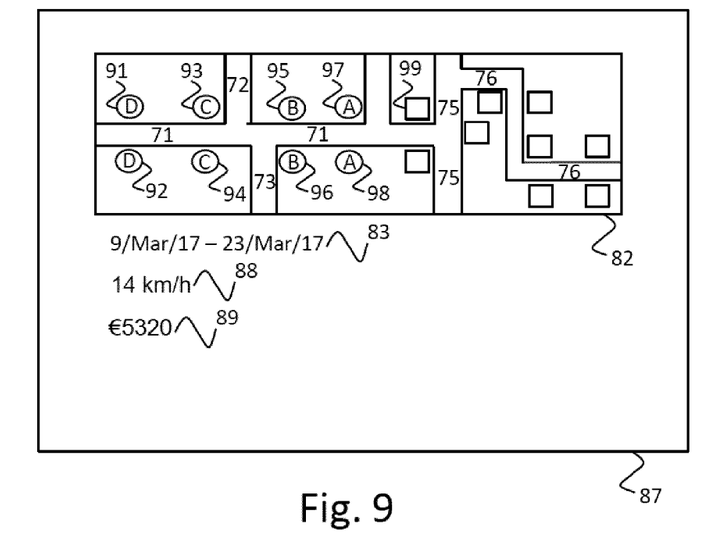
FIG. 9 is a third example of a user interface for selecting identified light beacons.

In the embodiment illustrated with the help of FIG. 9, the processor 25 is configured to use the transceiver 29 to further receive an indication of a content speed from the computer 33. A difference between the beginning of the first time window and the beginning of the last time window depends on the content speed. In an alternative embodiment, the user of computer 33 may not be able to select a content speed. The content speed may be predetermined or may be automatically determined by the first server 21, for example. The content speed is indicated in image 87 by speed indicator 88, but the content speed may be the average speed of persons walking, running or cycling past the light beacons of the average speed of cars driving past the light beacons, for example. This may be relevant during special city events. Image 87 also indicates the tot cost of "renting" the selected light beacons with the help of cost indicator 89: 5320 Euro for the period 9 Mar. 2017 to 23 Mar. 2017 for all selected light beacons.

Instead of using a path and a content speed, alternating content items may be synchronized between neighboring light beacons. For example, a specific light beacon might cycle through three content items, whereby the cycles are synchronized with neighboring beacons such that at the same time all beacons that are close to each other are associated with different content.

In the same or in another embodiment, the processor 25 of the first server 21 is configured to use the transceiver 29 to receive a reproduction condition to be associated with the selected one or more light beacons from the computer 33 and to associate the content item with the one or more light beacons and the reproduction condition in the memory 31 of the first server 21. The content item is only allowed to be reproduced on a mobile device 1 when the reproduction condition is met. The reproduction condition may comprise a group identifier identifying a group to which a user of the device should belong (e.g. "men" or "friends"), a required weather condition (e.g. "raining" or "sunny") and/or a maximum distance between a light beacon transmitting data and the mobile device 1 (e.g. determined using a GPS sensor of the mobile device 1), for example.

In another embodiment, the processor 25 of the first server 21 is configured to use the transceiver 29 to receive a transmission condition to be associated with the one or more light beacons from the computer 33 and to configure the one or more light beacons such that the one or more light beacons transmit first data (e.g. a first URL, content item or identifier) if the transmission condition is met and second data (e.g. a second URL, content item or identifier) if the transmission condition is not met. The first data enables reproduction of the content item and the second data does not enable reproduction of the content item. The transmission condition may comprise a required weather condition (e.g. "raining" or "sunny"), for example.

Figure 10:
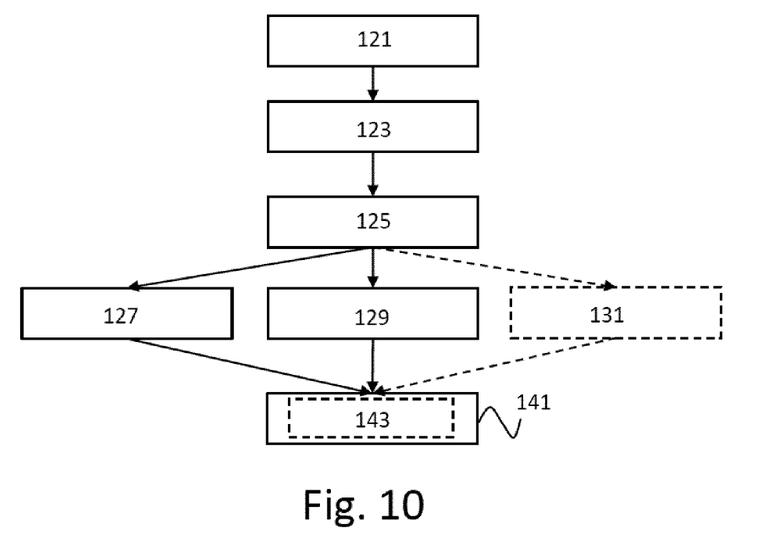
FIG. 10 is a flow diagram of a first embodiment of the method of the invention.

In a first embodiment of the method, see FIG. 10, a step 121 comprises receiving a geographical indicator. A step 123 comprises determining at least one light beacon based on the geographical indicator. Each of the at least one light beacon is configured to transmit data via visible light. A step 125 comprises outputting information identifying the at least one light beacon. A step 127 comprises receiving a selection of one or more of the at least one light beacon. A step 129 comprises receiving a content item or a reference to a content item to be associated with the one or more light beacons. A step 141 comprises associating the content item with the one or more light beacons. The association causes the one or more light beacons to transmit data via visible light which enables reproduction of the content item.

With regard to step 121: The associations may be part of a global service, or may be restricted to a particular area (e.g. a stadium). The more light beacons are part of the service, the more important it is to receive input on a specific location or area in order to present a user with the most relevant light beacons. This can be done in different ways. For instance, GPS can be used to detect a user's location, or the user may select a location or area from a list (e.g. Philips Stadium), a user may indicate a location or area on a map. The location can also be simply derived from detection of one or more light beacons in the field of view of the camera of a user device.

With regard to steps 123 and 125: The way the light beacons are identified may depend on which geographical indicator was received in step 121. For instance, if a camera is already used to detect light beacons, the camera view could be annotated to indicate which of the light beacons are available for content association. Whereas if the user has been using a map to indicate an area, the map could also be extended to provide input with regards to the availability of light beacons. Each light beacon may have a single content association or a single content association per target user group, but it may also be possible to have a multitude of content associations with a light beacon. For instance, it may be determined which of the associated content items matches best with the user profile and/or the current user context. Alternatively, upon detecting a beacon, a list of associated content items may be presented to the user, possibly ordered according to user profile or detected context match. Dependent on the service, the costs or terms and conditions of associating content with a light beacon may also be presented. For instance, an available light beacon can be presented together with the cost per time period of association. Optionally, the cost differs dependent on the size of a specified target group.

With regard to step 127: A user may be able to select one or more light beacons from a presented list, a presented augmented light beacon (camera) view, or on a map indicating the available beacons, for example. It may be possible to select one or to select a group of light beacons. The group can be a set of light beacons which are close together (e.g. detected next to each other in the camera view), but can also be spread over a larger area (e.g. all light beacons located near local cinemas on a CityTouch map).

With regard to step 129: A user may be able to simply select the stored content on his user device, indicate a link (URL) to the content, or start creating the content after making the association (e.g. start a video broadcast which becomes associated with the light beacon). It may also be possible that the service or this content selection step is integrated with social media apps. Some of those (e.g. Periscope, Facebook Live) already enable users to broadcast an event (e.g. a wedding or a performance) via a social media platform Linking this functionality to a light beacon makes it easy for people locally present to easily access the captured video stream.

In this first embodiment, the method further comprises a step 131 of receiving an indication of one or more time windows to be associated with the one or more light beacons. Step 141 comprises a step 143 of associating the content item with the one or more light beacons during the one or more time windows.

Figure 11:
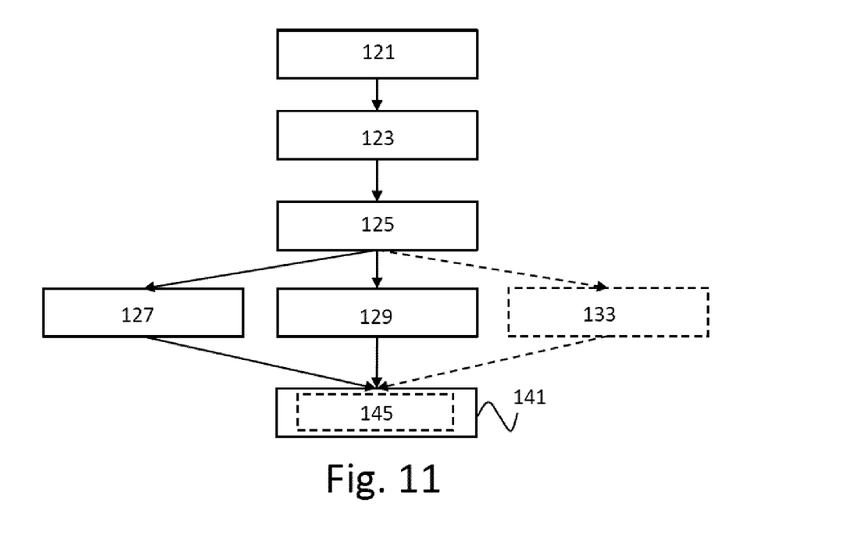
FIG. 11 is a flow diagram of a second embodiment of the method of the invention.

In a second embodiment, see FIG. 11, the method comprises a step 133 of receiving a reproduction condition to be associated with the one or more light beacons instead of step 131 of FIG. 10 (or in addition to step 131 of FIG. 10 if the first and second embodiments are combined). The content item is only allowed to be reproduced on a device when the reproduction condition is met. Furthermore, step 141 comprises a step 145 of associating the content item with the one or more light beacons and the reproduction condition.

Figure 12:
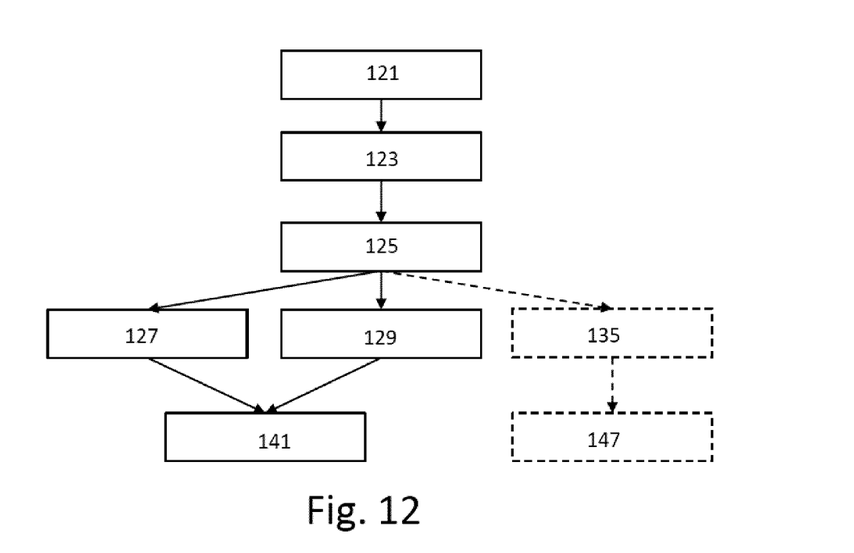
FIG. 12 is a flow diagram of a third embodiment of the method of the invention.

In a third embodiment, see FIG. 12, the method comprises a step 135 of receiving a transmission condition to be associated with the one or more light beacons instead of step 131 of FIG. 10 (or in addition to step 131 of FIG. 10 if the first and third embodiments are combined). Furthermore, a step 147 comprises configuring the one or more light beacons such that the one or more light beacons transmit first data if the transmission condition is met and second data if the transmission condition is not met. The first data enabling reproduction of the content item and the second data not enabling reproduction of the content item. Step 147 is performed after step 135.

Two or more of the first, second and third embodiments may be combined in a single embodiment. Some or all receiving steps (steps 127, 129, 131, 133 and 135) may be performed in parallel. Alternatively, all receiving steps may be performed in sequence (in any desired order).

Figure 13:
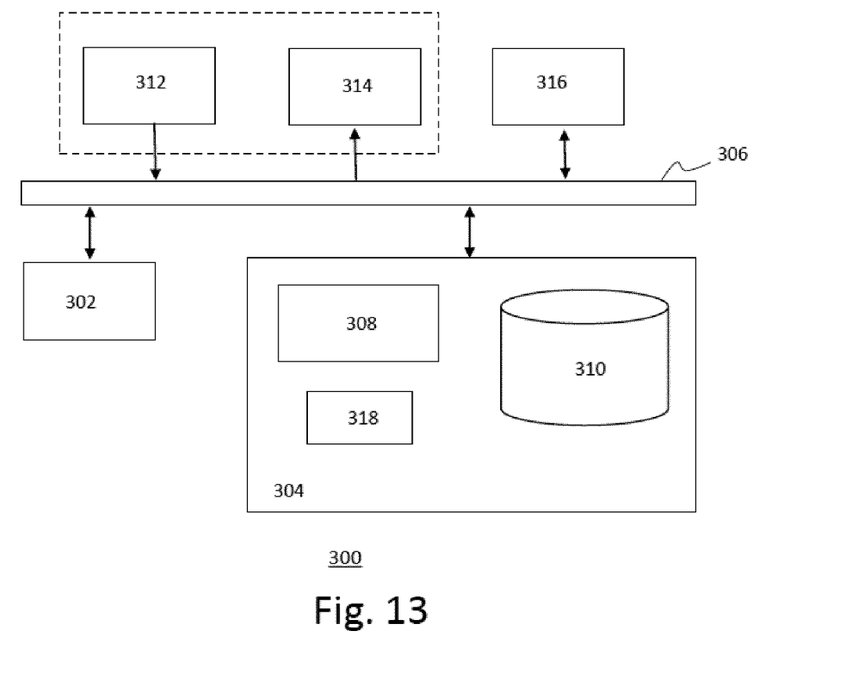
FIG. 13 is a block diagram of an exemplary data processing system for performing the method of the invention.

FIG. 13 depicts a block diagram illustrating an exemplary data processing system that may perform the method as described with reference to FIGS. 10 to 12.

As shown in FIG. 13, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 13 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 13, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 13) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for associating content with one or more light beacons, comprising a server, the server comprising:
at least one input interface for receiving input;
an output interface for providing output; and
at least one processor configured:
to receive a geographical indicator,
to determine a set of at least one light beacon based on said geographical indicator, each of said at least one light beacon being configured to transmit data via visible light,
to use said output interface to output information identifying said set of at least one light beacon,
to use said at least one input interface to receive a selection of one or more light beacons of said set of at least one light beacon,
to use said at least one input interface to receive a content item or a reference to a content item to be associated with said one or more light beacons, and
to associate said content item with said one or more light beacons, said association causing said one or more light beacons to transmit data via visible light which enables reproduction of said content item.

2. A system as claimed in claim 1, wherein said at least one processor is configured to use said at least one input interface to receive an indication of one or more time windows to be associated with said one or more light beacons and to associate said content item with said one or more light beacons during said one or more time windows.

3. A system as claimed in claim 1, wherein said at least one processor is configured to use said at least one input interface to receive a reproduction condition to be associated with said one or more light beacons, said content item only being allowed to be reproduced on a device when said reproduction condition is met, and to associate said content item with said one or more light beacons and said reproduction condition.

4. A system as claimed in claim 3, wherein said reproduction condition comprises a group identifier identifying a group to which a user of said device should belong, a required weather condition and/or a maximum distance between a light beacon transmitting data and said device.

5. A system as claimed in claim 1, wherein said at least one processor is configured to use said at least one input interface to receive a transmission condition to be associated with said one or more light beacons and to configure said one or more light beacons such that said one or more light beacons transmit first data if said transmission condition is met and second data if said transmission condition is not met, said first data enabling reproduction of said content item and said second data not enabling reproduction of said content item.

6. A system as claimed in claim 5, wherein said transmission condition comprises a required weather condition.

7. A system as claimed in claim 1, wherein said system comprises a memory and said at least one processor is configured to store an association between said content item or said reference to said content item and said one or more selected light beacons in said memory.

8. A system as claimed in claim 1, wherein said one or more light beacons comprise a plurality of light beacons and said at least one processor is configured to use said at least one input interface to further receive an indication of a path from a first set of said plurality of light beacons to a last set of said plurality of light beacons and to associate said content item with said first set of light beacons during a first time window and with said last set of light beacons during a last time window, said last time window starting later than said first time window.

9. A system as claimed in claim 1, wherein said one or more light beacons comprise a plurality of light beacons and said at least one processor is configured to use said at least one input interface to further receive an indication of a content speed parameter and to associate said content item with a first set of light beacons during a first time window and with a last set of light beacons during a last time window, a difference between the beginning of said first time window and the beginning of said last time window depending on said content speed parameter.

10. A method of associating content with one or more light beacons, comprising:
receiving a geographical indicator;
determining a set of at least one light beacon based on said geographical indicator, each of said at least one light beacon being configured to transmit data via visible light;
outputting information identifying said at least one light beacon;
receiving a selection of one or more light beacons of said set of at least one light beacon;
receiving a content item or a reference to a content item to be associated with said one or more light beacons; and
associating said content item with said one or more light beacons, said association causing said one or more light beacons to transmit data via visible light which enables reproduction of said content item.

11. A method as claimed in claim 10, further comprising receiving an indication of one or more time windows to be associated with said one or more light beacons, wherein associating said content item with said one or more light beacons comprises associating said content item with said one or more light beacons during said one or more time windows.

12. A method as claimed in claim 10, further comprising receiving a reproduction condition in relation to said one or more light beacons, said content item only being allowed to be reproduced on a device when said reproduction condition is met, wherein associating said content item with said one or more light beacons comprises associating said content item with said one or more light beacons and said reproduction condition.

13. A method as claimed in claim 10, further comprising receiving a transmission condition to be associated with said one or more light beacons and configuring said one or more light beacons such that said one or more light beacons transmit first data if said transmission condition is met and second data if said transmission condition is not met, said first data enabling reproduction of said content item and said second data not enabling reproduction of said content item.

14. A method as claimed in claim 10, further comprising receiving a confirmation that a payment has been received, wherein said content item is only associated with said one or more light beacons if said confirmation is received.

15. A computer program product storing at least one software code portion, the software code portion, when run on a computer system, being configured for enabling the method of claim 10 to be performed.

* * * * *